United States Patent

Kmecak et al.

[15] 3,679,769
[45] July 25, 1972

[54] ALKYL TRANSFER OF ALKYL AROMATICS WITH GROUP VIII METALS ON ZEOLITES

[72] Inventors: Ronald A. Kmecak; Stephen M. Kovach, both of Ashland, Ky.

[73] Assignee: Ashland Oil, Inc., Houston, Tex.

[22] Filed: Dec. 19, 1968

[21] Appl. No.: 785,251

[52] U.S. Cl. ..................260/672 T, 208/140, 252/455 X, 252/460, 252/462, 252/466 R, 260/668 A, 260/674 H
[51] Int. Cl. .................C07c 3/62, C07c 11/04, C10g 23/02, C10g 31/14
[58] Field of Search.............................................260/672 T

[56] References Cited

UNITED STATES PATENTS

| | | | |
|---|---|---|---|
| 3,250,728 | 5/1966 | Miale et al. | 252/455 |
| 3,410,921 | 11/1968 | Pollitzer | 260/672 |
| 3,417,157 | 12/1968 | Pollitzer | 260/672 |
| 3,437,710 | 4/1969 | Pollitzer | 260/672 |
| 3,442,794 | 5/1969 | Van Helden et al. | 208/111 |
| 3,442,795 | 5/1969 | Kerr et al. | 208/120 |
| 3,442,966 | 5/1969 | Pollitzer | 260/672 |
| 3,463,744 | 8/1969 | Mitsche | 252/442 |
| 3,464,929 | 9/1969 | Mitsche | 252/442 |
| 3,476,821 | 11/1969 | Brandenburg et al. | 260/672 |
| 2,795,629 | 6/1957 | Boedeker | 260/668 |
| 3,527,825 | 9/1970 | Pollitzer | 260/672 |

Primary Examiner—Delbert E. Gantz
Assistant Examiner—G. E. Schmitkons
Attorney—Walter H. Schneider

[57] ABSTRACT

A process for the alkyl transfer of alkyl aromatics including contacting an alkyl aromatic feed material, such as toluene, with a catalyst comprising a precious metal of Group VIII, such as platinum, palladium, rhodium, ruthenium, etc., deposited on a zeolite base at a temperature of about 700° to 1,100° F, a pressure of about 0 to 2,000 psig, and a liquid hourly space velocity of about 0.1 to 10, and in the presence of hydrogen introduced at a rate of about 1 to 10 moles hydrogen per mole of hydrocarbon feed. Promoters selected from Group I, Group II, Group IV, and the Rare Earth metals of the Periodic System may be added to the catalyst. Deactivated catalyst may be periodically rejuvenated by discontinuing the introduction of aromatic feed material and purging with hydrogen and the catalyst can be reactivated by calcination in air. Where toluene is the feed, the alkyl transfer product may be distilled to separate benzene, toluene and xylenes, the toluene may be recycled to the alkyl transfer step, the xylenes may be crystallized to separate para-xylene from the remaining xylenes, the mother liquor from the crystallization step may thereafter be isomerized to readjust the para-xylene content and the product of the isomerization may be recycled to the crystallization zone.

8 Claims, 1 Drawing Figure

PATENTED JUL 25 1972  3,679,769
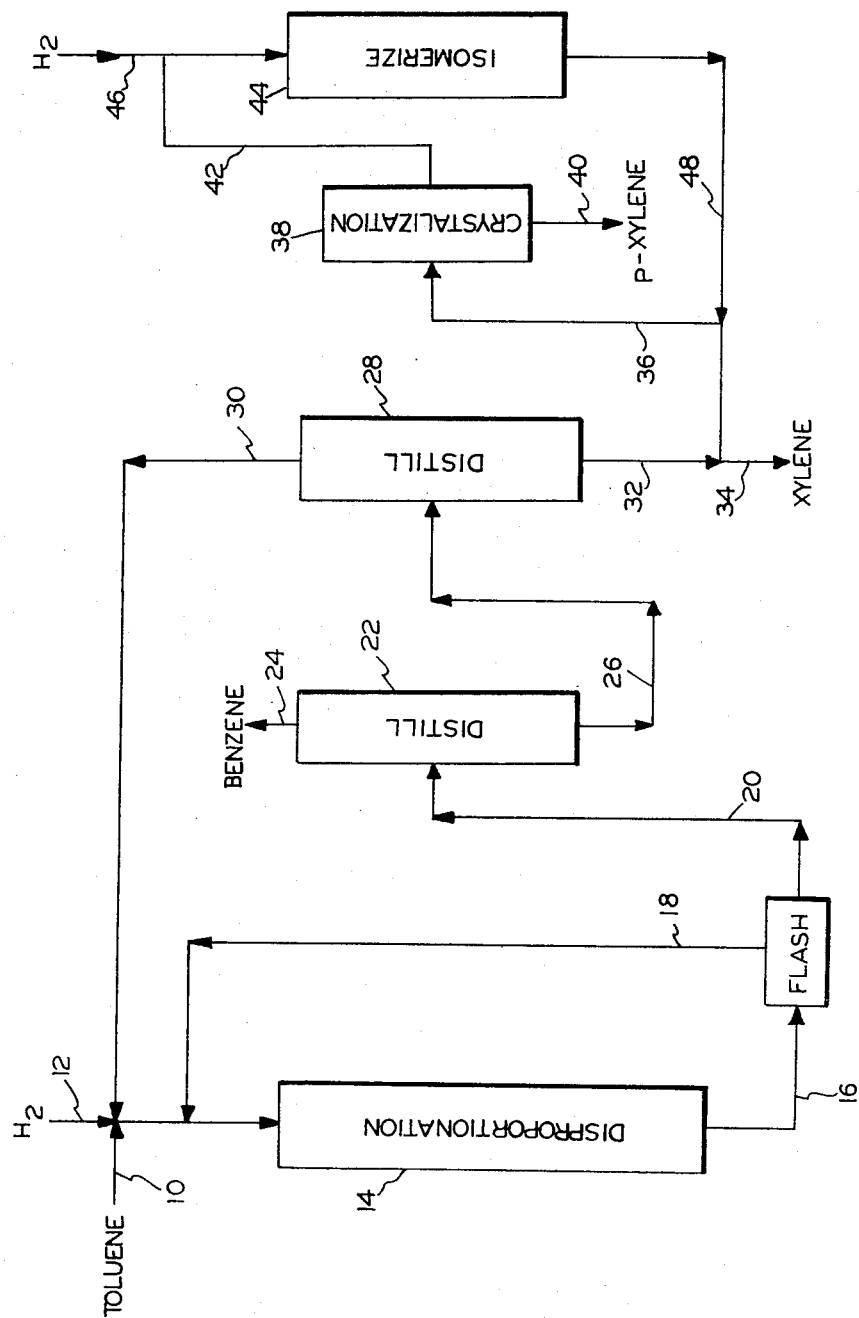
INVENTOR
Ronald A. Kmecak
Stephen M. Kovach
BY Walter H. Schneider
ATTORNEY

ALKYL TRANSFER OF ALKYL AROMATICS WITH GROUP VIII METALS ON ZEOLITES

BACKGROUND OF THE INVENTION

The present invention relates to a process for the catalytic conversion of hydrocarbons and, more particularly, to a process for the catalytic alkyl transfer of alkyl aromatics.

Aromatic hydrocarbons, such as benzene, naphthalene, and their alkyl derivatives are important building blocks in the chemical and petrochemical industries. For example, benzene and its derivatives have numerous uses; cyclohexane is utilized in nylon production; naphthalene is utilized in the production of phthalic anhydride for alkyd resins, etc.; para-xylene can be used for the production of terephthalic acid which, in turn, is utilized in the production of synthetic resins, such as dacron, mylar, etc., etc.

For many years, the primary source of such aromatic hydrocarbons has been coal tar oils obtained by the pyrolysis of coal to produce coke. Such coal tar oils contain principally benzene, toluene, naphthalene, methylnaphthalene and para-xylene. Benzene may be produced from such oils by direct separation, such as distillation techniques, the para-xylene may be separated by crystallization, and the naphthalene fractions by direct separation techniques. Further alkyl derivatives of benzene and naphthalene can be converted to increased volumes of benzene and naphthalene by hydrodealkylation.

More recently, however, the petroleum industry has become a leading source of these aromatic hydrocarbons. The reason for this has been the availability of the catalytic reforming process in which naphthene hydrocarbons are dehydrogenated to produce a reformate rich in aromatics and more efficient processes for separating the aromatics from the reformate.

Some years ago, there was a high demand for toluene which was used in the production of TNT. This led to the building of substantial facilities for its production. However, the advent of nuclear and fusion weaponry and the use of diesel oil-ammonium nitrate explosives has left toluene in substantial oversupply, since the only major uses of toluene are as a solvent, the production of toluene diisocyanates and the production of benzene. This has resulted in extensive efforts to develop methods for converting toluene to benzene. One method of converting toluene to benzene is by the previously mentioned hydrodealkylation.

Dealkylation has the primary disadvantage that methane is a major product. Volume yields of benzene are therefore low and carbon deposition on the catalyst is high. The large amounts of methane, while useful as a fuel, require expensive techniques for the removal of the methane from the circulating hydrogen stream utilized in the hydrodealkylation. In addition, large quantities of hydrogen are consumed in the dealkylation process and hydrogen is often in short supply and expensive to produce. Finally, where catalysts are used in the process, carbon laydown on the catalyst is a serious problem.

A more profitable reaction for changing alkyl aromatics to other aromatic products is an alkyl transfer reaction. An alkyl transfer reaction is a process wherein alkyl groups are caused to be transferred from the nuclear carbon atoms of one aromatic molecule to the nuclear carbon atoms of another aromatic molecule. By way of example, an aromatic hydrocarbon molecule containing one nuclear alkyl substituent, such as toluene, may be treated by disproportionation to produce an aromatic hydrocarbon with no alkyl substituents, namely, benzene, and aromatic hydrocarbon molecules with two nuclear alkyl substituents, namely xylenes. Similarly, product ratios may be shifted by transalkylation of xylene and benzene to toluene. Such an alkyl transfer reaction has distinct advantages: methane is not produced, but instead, valuable aromatic hydrocarbons are produced in addition to the desired aromatic hydrocarbon. As a result, there is very little loss of product in alkyl transfer as opposed to hydrode-alkylation.

Alkyl transfer may be carried out thermally. However, thermal alkyl transfer results in demethylation due to cracking and hydrogenation, ultimately resulting in low yields of desired aromatics. On the other hand, catalytic alkyl transfer has not been highly successful since it requires an active, rugged, acidic catalyst. Typical catalysts are solid oxides, such as silica-alumina, silica-magnesium, etc. These materials, however, are not active enough to promote disproportionation at high conversion rates. In addition, as is the case in hydrodealkylation, carbon deposition on the catalyst and its affect on catalyst activity with time is a severe problem.

It is therefore an object of the present invention to provide an improved process for the conversion of alkyl aromatics. Another object of the present invention is to provide an improved process for the alkyl transfer of alkyl aromatics. Yet another object of the present invention is to provide an improved process for the disproportionation of toluene to produce benzene and xylenes. Another and further object of the present invention is to provide an improved process for the disproportionation of alkyl aromatics which utilizes a novel catalyst system. Another object of the present invention is to provide an improved process for the disproportionation of alkyl aromatics with a catalyst system resistant to carbon laydown. A further object of the present invention is to provide an improved process for the catalytic disproportionation of alkyl aromatics utilizing a precious metal of Group VIII on a zeolite base. A further object of the present invention is to provide an improved process for the disproportionation of alkyl aromatics utilizing critical conditions of temperature and pressure which produce maximum disproportionation and conversion of one aromatic to another. Still another object of the present invention is to provide an improved process for the conversion of toluene to benzene and xylenes and conversion of meta- and ortho- xylenes to additional para-xylene. These and other objects and advantages of the present invention will be apparent from the following detailed description.

SUMMARY OF THE INVENTION

Briefly, in accordance with the present invention, alkyl transfer of alkyl aromatics comprises contacting an alkyl aromatic feed material with a catalyst comprising a precious metal of Group VIII of the Periodic System deposited on a zeolite base. Further improvement of the catalyst is obtained by adding a Group I, Group II, Group IV, a Rare Earth metal or mixtures thereof. Further improvements of the process are obtained by maintaining the temperature between about 700° and 1,100° F. and the pressure between about 0 and 2,000 psig. Where toluene is the feed, additional para-xylene is produced by isomerizing ortho- and meta- xylenes.

BRIEF DESCRIPTION OF THE DRAWINGS

The drawing shows a flow diagram of a process system in accordance with the present invention.

DETAILED DESCRIPTION OF THE INVENTION

Alkyl aromatic feed materials for use in accordance with the present invention can be any alkyl aromatic having at least one transferrable alkyl group. Primary materials are alkyl aromatics having from seven to 15 carbon atoms, mixtures of such alkyl aromatic hydrocarbons, or hydrocarbon fractions rich in such alkyl aromatic hydrocarbons. Such feeds include mono- and di-aromatics, such as alkyl benzenes and alkyl naphthalenes. Preferably, the alkyl group should contain no more than about four carbon atoms. A preferred feed in accordance with the present invention is toluene. Accordingly, disproportionation of toluene will be referred to hereinafter in the detailed description.

The process of the present invention should be conducted at a temperature between about 700° and 1,100° F., and preferably between 800 and 1,000° F. It has been found in accordance with the present invention that below this temperature range, substantially decreased conversion occurs due to hydrogenation. On the other hand, when operating above this temperature range, thermal demethylation occurs. The pressure utilized in accordance with the present invention has also been determined to be a critical factor. Accordingly, the process should be carried out between about 0 and 2,000 psig and preferably, between 300 to 600 psig. It has been found that below the desired pressure range, conversion is low and the aromaticity of the product is high. On the other hand, at higher pressures, conversion is high, but liquid recoveries are low due to hydrogenation and hydrocracking. A liquid hourly space velocity between about 0.1 and 10, and preferably between 0.25 to 1.0, should be utilized and a hydrogen-to-hydrocarbon mole ratio between about 1 and 10 to 1 and preferably between about 2 and 4 to 1 is desired.

The high severity conditions required to obtain disproportionation of alkyl aromatics, particularly the disproportionation of toluene, has been found to lead to catalyst deactivation due to selective adsorption and condensation of aromatics on the catalyst surface and carbon laydown on the catalyst. It was found that the condensation and adsorption of aromatics on the catalyst is a temporary poison and that this condition can be alleviated by utilizing high hydrogen partial pressures. In addition, this temporary deactivation of the catalyst can be overcome to completely rejuvenate the catalyst to near virgin activity by hydrogen-purging of the catalyst in the absence of aromatic hydrocarbon feed. While coke or carbon deposition on the catalyst is a permanent poison, it has been found, in accordance with the present invention, that carbon laydown can be decreased by utilizing the catalysts of the present invention. Further, it was found that when these catalysts become deactivated by carbon laydown, they can be restored to near virgin activity by regeneration in air.

The zeolites are a class of hydrated silicates of aluminum and either sodium or calcium or both, having the general formula $Na_2O \cdot Al_2O_3 \cdot nSiO_2 \cdot xH_2O$. Originally, the term zeolite described a group of naturally-occurring minerals which were principally sodium or calcium aluminosilicates. Such naturally occurring zeolites include, for example, chabazite, gmelinite, erionite, faujasite, analcite, heulandite, natrolite, stilbite, thomsonite, etc. Synthetic zeolites are generally known in the trade by a tradename or trade designation applied by the specific manufacturer. For example, Types A, X, and Y are manufactured by Linde Company and a synthetic mordenite is designated Zeolon by its manufacturer, the Norton Company. Zeolites generally have a rigid, three-dimensional anionic network with intracrystalline channels whose narrowest cross-section has essentially a uniform diameter. Thus, zeolites, of both natural and synthetic origin, can be distinguished from crystalline aluminosilicate clays, such as bentonite, which have a two-dimensional layer structure, and silica-alumina synthetic catalysts which are amorphous alumino-silicates having a random structure.

Zeolites whose atoms are arranged in a crystal lattice in such a way that there are a large number of small cavities innerconnected by smaller openings or pores of precisely uniform size are generally referred to as molecular sieves. Some natural zeolites exhibit molecular sieve characteristics to a limited degree. However, the synthetic zeolites as a class exhibit these characteristics.

A synthetic zeolite found particularly effective in the present process is a Type Y molecular sieve manufactured by Linde Company. This material has the general formula $Na_{56+y}aq(AlO_2)_{56+y}(SiO_2)_{136-y}$ where $y$ has a value of about 0 and can vary from $-8$ to 20. The Type Y zeolite crystallizes in the cubic system and the lattice constant for the sodium form, with a Si/Al ratio of 2.5 is 24.66 A. In the sodium form of Y, the negative charge in each $AlO_4$ is balanced by a closely associated sodium atom. In the divalent cationic form, however the divalent cation, usually calcium or magnesium, is asymmetrically located with respect to the aluminas.

Synthetic mordenite, designated Zeolon by the Norton Company, has a high silicon to aluminum ratio, generally about 5 to 1. The postulated formula for this material is $(Ca,Na_2) Al_2Si_9O_{22} \cdot 6H_2O$. The basic unit is a tetrahedron consisting of one silicon or aluminum atom surrounded by 4 oxygens. The crystal is made up of 4 and 5-membered rings of these tetrahedra. The chains are linked together to form a network having a system of large parallel channels interconnected by small cross channels.

Processes for depositing the active metal of the present invention on the zeolites are well known in the art. This simply consists of replacing all or a part of the exchangeable cations of the zeolite with the metallic ions by ion exchange.

The Type Y or the mordenite may be utilized in accordance with the present invention by first converting the sodium or calcium form to the hydrogen form which is often referred to as the acid form. Conversion to the hydrogen form may be carried out by either replacement of the metal cations with hydrogen ions or by replacement of the metal ions with ammonium ions, followed by decomposition of the ammonium by calcination. By this technique, from 95 to 99 percent of the metal is removed and replaced by hydrogen. Thereafter, the desired active metal is exchanged for the hydrogen to form the finished catalytic material.

The active Group VIII metal added to the zeolite includes the precious metals or second and third transition series, such as platinum, palladium, rhodium, ruthenium, etc. The precious metal component should be present in amounts between about 0.01 and 1 percent by weight.

It has also been found that conversion may be improved and, more significantly, carbon laydown on the catalyst may be reduced by the addition thereto of a promoter. Such promoters may be selected from Group I of the Periodic System, such as potassium, rubidium, cesium, etc., Group II of the Periodic System, such as calcium, magnesium, strontium, etc., a Rare Earth metal of the Periodic System, such as cerium, thorium, etc., a Group IV metal of the Periodic System, such as tin or lead, or mixtures of these, and particularly mixtures of a Group IV metal with one of the other groups mentioned. The promoters are preferably in their oxide form and are present in amounts of about 1 to 15 percent by weight based on the weight of the finished catalyst.

In accordance with the present invention, an integrated process for the production of benzene and para-xylene from toluene can be carried out with resultant high yields of these two valuable products. This process is best described by reference to the drawing.

In accordance with the drawing, toluene is introduced to the system through line 10, hydrogen is added through line 12 and these materials are passed over the catalyst of the present invention in the disproportionation reactor 14. The effluent passing through line 16 is passed to a flash drum for the removal of hydrogen and any light gases produced. These materials are discharged through line 18. Since little or no demethanation occurs, the hydrogen is substantially pure and may be recycled to the disproportionation reaction without further treatment. However, in some instances, further purification of the hydrogen is necessary before recycle or reuse. The liquid product passes through line 20 to a first distillation unit 22. In distillation unit 22, benzene is recovered as an overhead through line 24. The bottoms product from distillation unit 22 passes through line 26 to a second distillation unit 28. In distillation unit 28, toluene is removed as an overhead product and recycled to the disproportionation section through line 30. The bottoms product from distillation unit 28 is a mixture of xylenes which is discharged through line 32. This product may be withdrawn, as such, through line 34. Preferably, however, the xylene product is passed through line 36 to crystallization unit 38. In crystallization unit 38, para-xylene is selectively removed and withdrawn through line 40. The mother liquor from the crystallization section is passed through line 42 to an isomerization unit 44. Hydrogen is added through line 46. In the isomerization unit 44, the equilibrium concentration of para-xylene is re-established and the material may then be recycled through line 48 to crystallization unit 38 for further para-xylene separation.

The isomerization reaction should be carried out under more mild conditions than the disproportionation. Catalysts useful in the disproportionation reaction might also be used in the isomerization or conventional catalysts, such as, platinum on silica-alumina, can be used. The isomerization may be carried out at temperatures of about 500° to 900° F., and preferably 550° to 650° F., pressures of 50 to 2,000 psig, and preferably 300 to 600 psig, at a liquid hourly space velocity of 0.1 to 10, and utilizing a hydrogen-to-hydrocarbon mole ratio between about 1 and 20 to 1.

When reference is made herein to the Periodic System of Elements, the particular groupings referred to are as set forth in the Periodic Chart of the Elements in "The Merck Index," Seventh Edition, Merck & Co., Inc., 1960.

The term "alkyl transfer" of alkyl aromatics as used herein is meant to include disproportionation and transalkylation. Disproportionation, in turn, is meant to include conversion of two moles of a single aromatic, such as toluene, to one mole each of two different aromatics, such as xylenes and benzene. Transalkylation is meant to include conversion of one mole each of two different aromatics, such as xylenes and benzene, to one mole of a single different aromatic, such as toluene. The alkyl transfer defined above is also to be distinguished from isomerization where there is no transfer of alkyl groups from one molecule to another but simply a shifting of alkyl group around the aromatic ring, such as isomerization of xylenes, or rupture of the ring or the alkyl side chain and rearrangement of split-off carbon atoms on the same molecule. The alkyl transfer is also to be distinguished from a hydrogen transfer reaction, such as the hydrogenation of aromatics, the dehydrogenation of cycloparaffins and like reactions.

We claim:

1. A process for the alkyl transfer of alkyl aromatics; comprising, contacting an alkyl aromatic feed material with a catalyst consisting essentially of about 0.01 to 1 percent by weight of the finished catalyst of platinum deposited on a synthetic zeolite base having a silicon-to-aluminum ratio below about 5 to 1, while maintaining a temperature of about 800° to 1,000° F., about 300 to 6,000 psig., a liquid hourly space velocity of about 0.1 to 10, and a hydrogen-to-hydrocarbon mol ratio of between about 1 and 10 to 1, to cause alkyl transfer of said alkyl aromatics.

2. A process in accordance with claim 1 wherein the flow of feed material through the catalyst is interrupted periodically and the flow of hydrogen is continued for a time sufficient to reactive the catalyst.

3. A process in accordance with claim 1 wherein the flow of feed material and hydrogen through the catalyst is discontinued and the catalyst is calcined in air under conditions sufficient to reactivate the catalyst.

4. A process in accordance with claim 1 wherein the feed material contains substantial volumes of toluene.

5. A process in accordance with claim 4 wherein unconverted toluene is separated from the alkyl transfer product and said unconverted toluene is recycled to the disproportionation step.

6. A process in accordance with claim 4 wherein xylenes are separated from the alkyl transfer product and para-xylene is separated from said xylenes.

7. A process in accordance with claim 6 wherein the xylenes remaining after the separation of para-xylene are subjected to isomerization, at a temperature of about 500° to 900° F., a pressure of about 50 to 2,000 psig., a liquid hourly space velocity of about 0.1 to 10 and in the presence of hydrogen at a mol ratio of about 1 to 20 mols hydrogen per mol of hydrocarbon, to produce additional paraxylene.

8. A process for the alkyl transfer of alkyl aromatics; comprising, contacting an alkyl aromatic feed material with a catalyst consisting essentially of about 0.01 to 1 percent by weight of the finished catalyst of platinum and about 1 to 15 percent by weight of a metal oxide of a metal selected from the group consisting of Group IV and the Rare Earth metals of the periodic system and mixtures thereof deposited on a synthetic zeolite base having a silicon-to-aluminum ratio below about 5 to 1, while maintaining a temperature of about 800° to 1,000° F., about 300 to 600 psig, a liquid hourly space velocity of about 0.1 to 10, and a hydrogen-to-hydrocarbon mol ratio of between about 1 and 10 to 1, to cause alkyl transfer of said alkyl aromatics.

* * * * *